May 17, 1960 J. DRABIK 2,936,782
DIAPHRAGM-TYPE GAS PRESSURE REGULATOR
Filed April 16, 1956
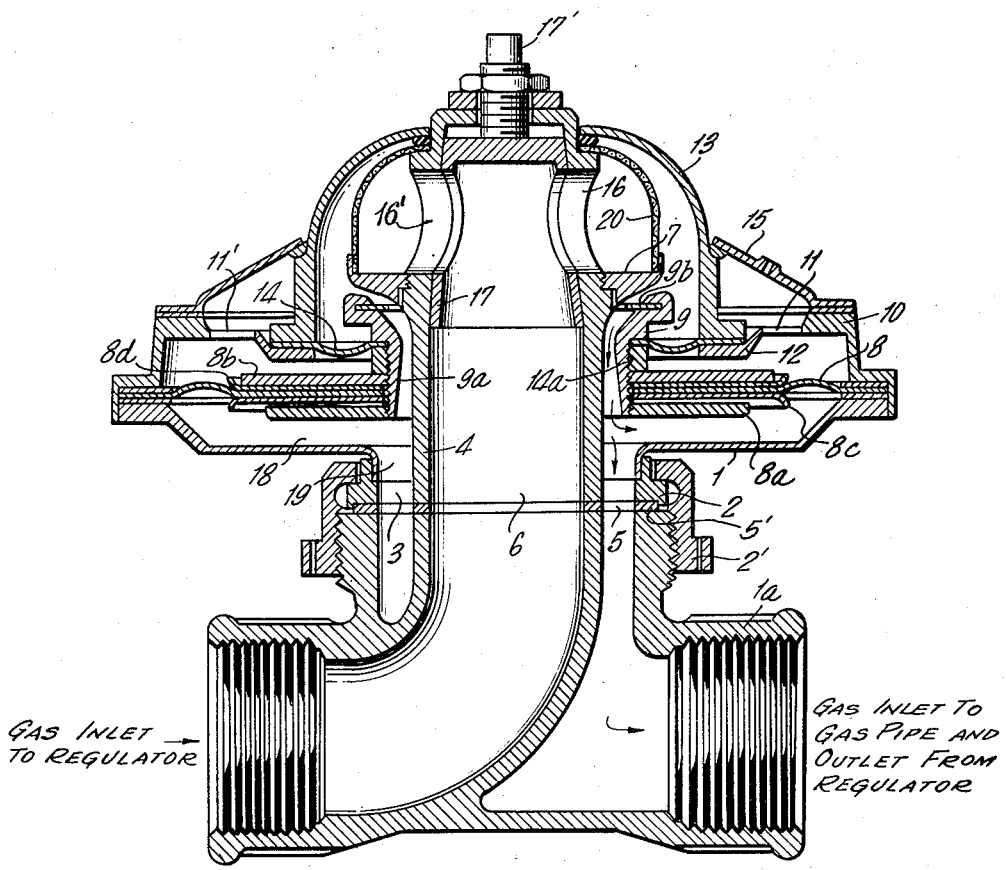
INVENTOR.
JOSEF DRABIK

United States Patent Office 2,936,782
Patented May 17, 1960

2,936,782

DIAPHRAGM-TYPE GAS PRESSURE REGULATOR

Josef Drabik, Jeggen, Landkreis Osnabruck, Germany, assignor to G. Kromschröder Aktiengesellschaft, Osnabruck, Germany Application April 16, 1956, Serial No. 578,387

Claims priority, application Germany April 26, 1955

7 Claims. (Cl. 137—613)

This invention refers to diaphragm-type gas pressure regulators. Gas pressure regulators are known in which a stationary valve plate cooperates with an annular valve seat body which is affixed to the diaphragm, said valve plate and seat body defining together a throttle of regulatable cross-section.

The present invention is distinguished from pressure regulators of this known type in that the valve plate is of annular construction and is supported by a tubular hollow body which is open above the valve plate and defines the gas inlet channel or gas flow path. Said hollow body is arranged concentrically with an outlet fitting or flange connection extending along the axis of symmetry of the housing of the regulator.

It is therefore an important object of the invention to provide means affording a considerable simplification of all constructional constituents of pressure regulation of the aforesaid type, whereby the housing of the regulator, as well as the inner parts thereof may be symmetrically shaped with respect to the axis of rotation, thus contributing to improved and efficient manufacturing facilities for the regulator parts.

The tubular hollow body defines together with the outlet connection a double-conduit union or flange which can be kept free from stresses and easily threaded onto a correspondingly constructed pipe connection so as to isolate the regulator from all stresses existing in the pipe line through which the gas is flowing. In a regulator construction of this kind an exteriorly actuatable shutting gate or obturating member may be easily incorporated or built in for the purpose of closing the opening of the gas inlet channel lying above the valve plate. Upon astuation of said member to close said opening, i.e. the inlet channel, the upper parts of the regulator housing may be removed to provide access to the inner or operative parts of the regulator without necessitating disconnection of the regulator from the pipe line.

It is therefore another important object of the present invention to provide means ensuring repair and replacement of inner vital parts of the regulator, without the need of disengagement of the latter from its pipe line.

These and other objects of the invention will become further apparent from the following detailed description, reference being made to the accompanying drawing in which a sectional view of a regulator is shown, embodying features of the present invention.

Referring more particularly to the drawing, there is disclosed a lower part 1 of a regulator housing provided with a connecting end or flange 2 arranged concentrically with the axis of symmetry of the housing and adapted to be connected to a pipe line or union (not shown) by means of a cap nut 2'. Concentrically arranged with said flange 2 and connected to the latter by means of radial bars or webs 3 is a tubular hollow body 4 which terminates in a plane coinciding with the sealing plane 5 of the flange 2 and which is constructed to communicate with a cocrresponding channel in the aforesaid union to be connected to the pipe line.

The hollow body 4, having upper and lower ends, defines the inlet channel 6 of the regulator and carries a gasket 5' at its lower end and an exteriorly positioned annular valve plate body 7 between said ends. A working diaphragm 8 made of flexible metal or like suitable material which closes the upper end of the lower housing part 1 is connected with an annular valve seat body 9 by means of ring members 8a, 8b threaded at 9a onto body 9. Between said ring members are sandwiched sealing strips 8c, 8d. The valve seat body 9, which encircles the hollow body 4 adjacent the valve plate 7 and is floatingly supported and biased toward said valve plate by the diaphragm 8, is shaped to form a variable Venturi nozzle in conjunction with the valve plate 7.

The upper part of the housing consists of an intermediate housing section 10 connected to the lower part 1 and provided with a bearing ring 12, the latter being supported on section 10 by means of cross bars or webs 11 and 11'. A bell-shaped body 13 has its lower end supported on said ring 12 and its upper end tightly connected to the hollow body 4 with the aid of suitable sealing means.

Between said bearing or support ring 12 and bell-shaped body 13 there is disposed a compensating diaphragm 14 which is connected to the valve seat body 9 by means of a ring element 14A. A conical sheet metal ring 15 is tightly connected to the intermediate section 10 and abuts against the bell-shaped body 13 pressing the latter downwardly, respectively, onto both the aforesaid ring 12 and the tubular hollow body 4.

Body 4 defining the inlet channel is provided at a location above the valve body 7 with outlet openings 16 and 16' which may be operated (opened or closed) by means of a hollow stopcock or plug 17 arranged axially within the hollow body 4. A rectangular extension or bolt 17' of said stopcock 17 extends upwardly and out of the hollow body 4, whereby said stopcock may be operated from the exterior of the regulator housing.

Gas flowing into the channel 6 from the pipe line passes through openings 16 and 16' into the interior of the bell-shaped body 13 and thence, after passage through the regulating section defined by the valve body 7 and the valve seat body 9 (the latter carrying a sealing disk 9b), into the pressure space 18 beneath the weighted or loaded working diaphragm 8. From this space 18 the gas flows subsequently into the outlet channel 19 of the connecting end or flange 2.

When the openings or passageways 16 and 16' are closed or obturated by turning stopcock 17 in a known manner, the regulator housing may be readily disassembled through removal of the aforementioned parts 15, 13 and 10, whereby, for example, the diaphragms 8 and 14 may be removed and cleaned or replaced without necessitating disconnection of the nipple 2 from the pipe line through release of the cap nut 2'. It is furthermore contemplated in accordance with the present invention to mount on the valve body 7 a bell-shaped screen or filter body 20, so as to surround the outlet openings 16 and 16', as a result of which the gas will be first filtered as it enters the path as hereinabove pointed out.

As will readily be recognized, the diaphragm 8 and the diaphragm 14 are so constructed as to urge the valve seat body 9 against the valve plate 7 when no pressure is applied against working membrane or diaphragm 8. The valve seat body 9 is biased toward an engagement with the valve plate 7 whereby the outlet flow path will be obturated whenever no gas is flowing into the inlet through the pipe line to which the regulator is connected.

The diaphragm 14 acts as a compensation diaphragm because it is partly covered by a portion of the valve seat body 9 and therefore the regulator will be independent of the inlet gas pressure. Membrane 8 acts as a working diaphragm which is sandwiched as stated hereinabove between disks or ring members 8c and 8d. Weight 8b together with the own weight of the floating regulator parts 9, 8, 8a—8d will determine the pressure to be regulated. Effective on the lower side of the membrane or diaphragm 8 is a back pressure, which pressure increases, for instance, due to a disconnection of any of the gas consuming appliances (not shown) while the gas flows through the inlet to the pipe line. The working membrane 8 and through it the valve seat body 9 is lifted toward valve plate 7 to regulate (reduce) the effective area of the passageway between valve seat body 9 and valve plate 7. Consequently, when all gas consuming appliances are shut off, then the aforesaid back pressure increases to such an extent that the passageway will be closed and stays closed. If, however, further gas consuming appliances are opened and included in the pipe line, then the regulated pressure decreases and consequently the working membrane 8 acts so that the valve seat body 9 opens the passageway until a regulated gas pressure is obtained which will take into consideration the proper weight of the aforesaid floating valve parts and the added weight 8b. As soon as gas begins to flow, with an attendant rise in pressure, the valve seat body 9 is forced away from the valve plate 7 to an extent determined by the pressure of the gas and by the biasing force of the diaphragm 8. The latter may of course be accurately calibrated to ensure that the distance between the valve plate 7 and the valve seat body 9, i.e., the cross-section of the outflow passageway, is varied in accordance with the pressure variations of the inflowing gas so as to maintain the pressure of the gas returned to the pipe line at a constant value. The gating or flow control means 17 will, of course, be actuated to close the inlet flow path 6 only when it is desired to interrupt the flow of gas completely.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A gas pressure regulator, comprising a housing having an axis of symmetry and being provided with a first opening centered at said axis and defining an outlet from said housing, a tubular hollow body disposed within said housing and coaxially therewith, said body being provided at one end with a second opening arranged concentrically with respect to said first opening and in said housing and defining an inlet to said housing, said body being further provided at its other end with apertures establishing communication between the interior of said hollow body and the interior of said housing, an annular valve plate located on the exterior of said body and intermediate said ends thereof, an annular valve seat body encircling said hollow body adjacent said valve plate, and a working diaphragm arranged within said housing and carrying said valve seat body for movement toward and away from said valve plate to thereby define a passageway of variable cross-section between said valve plate and said valve seat body, said working diaphragm normally urging said valve seat body against said valve plate closing said passageway when there is no gas entering said regulator, the greater the pressure of gas entering said regulator and applied as a force on said valve seat body the larger said passageway whereby the area of said passageway determines the amount of gas flowing therethrough, gas entering the regulator through said second opening, flowing through said hollow body, said apertures and said passageway, and leaving the regulator through said first opening.

2. A diaphragm type gas pressure regulator comprising a housing having an axis of symmetry, a tubular hollow body open adjacent its opposite ends and located within said housing, said hollow body defining an inlet flow path for said gas and having an axis coinciding with said axis of symmetry, a part of the interior of said housing exteriorly of said hollow body defining an outlet flow path for said gas terminating adjacent one of said ends of said tubular body, an annular valve plate carried by and encircling said hollow body exteriorly thereof and intermediate said ends, an annular valve seat body arranged within said housing and coacting with said valve plate, and diaphragm means supporting said valve seat body for movement axially of said hollow body toward and away from said valve plate, a passageway between said valve seat body and said valve plate, said diaphragm means normally urging said valve seat body against said valve plate closing said passageway when there is no gas entering said regulator, the greater the pressure of gas entering said regulator and applied as a force on said valve seat body the larger said passageway, whereby said passageway is variable in response to inlet gas pressure to regulate outlet gas pressure.

3. A regulator according to claim 2, said diaphragm means being springlike and biasing said valve seat body in the direction of said valve plate so as to close said outlet flow path when flow of gas ceases.

4. A regulator according to claim 2, further comprising flow control means arranged at the other end of said tubular hollow body and actuatable from exteriorly of said housing to open and close said other end of said hollow body, respectively, whereby said inlet flow path may be obturated to prevent gas from reaching said outlet flow path.

5. A regulator according to claim 4, said openings adjacent said other end of said hollow body being a plurality of circumferentially spaced apertures, said flow control means comprising a hollow tubular stopcock provided with a plurality of circumferentially spaced openings, said stopcock being rotatably positioned interiorly of and coaxially with respect to said hollow body, whereby upon rotation of said stopcock, said openings thereof may be moved into and out of registry with said apertures of said hollow body, respectively.

6. A regulator according to claim 2, further comprising filter means located within said housing and covering said open other end of said hollow body, whereby transmission of impurities contained in said gas to said outlet flow path is prevented.

7. A regulator according to claim 2, said housing being provided with a connecting flange defining the outlet terminus of said outlet flow path, said one end of said hollow body being located within and concentrically with respect to said flange.

References Cited in the file of this patent

UNITED STATES PATENTS

| 973,609   | Abrams         | Oct. 25, 1910 |
| 1,539,032 | Tytler et al.  | May 26, 1925 |
| 1,800,185 | Thrush         | Apr. 7, 1931 |
| 1,997,404 | Hamilton       | Apr. 9, 1935 |
| 2,219,408 | Bentz et al.   | Oct. 29, 1940 |
| 2,272,243 | Jacobsson et al.| Feb. 10, 1942 |